F. S. Pease.

Carburetor.

No. 2,893. Reissued Mar. 10, 1868.

Witnesses:
Wm. H. Pease
Joseph D. Dudley

Inventor:
F. S. Pease

UNITED STATES PATENT OFFICE.

F. S. PEASE, OF BUFFALO, NEW YORK.

IMPROVED HYDROCARBON-VAPOR APPARATUS.

Specification forming part of Letters Patent No. 27,470, dated March 13, 1860; Reissue No. 2,893, dated March 10, 1868.

*To all whom it may concern.*

Be it known that I, F. S. PEASE, of Buffalo, in the county of Erie and State of New York, have invented a new and improved apparatus for impregnating gas, &c., with the vapors of hydrocarbon liquids; and I do hereby declare that the following is a full, clear, and exact description of the same, reference being had to the accompanying drawings, forming a part of this specification, in which—

Figure 1:
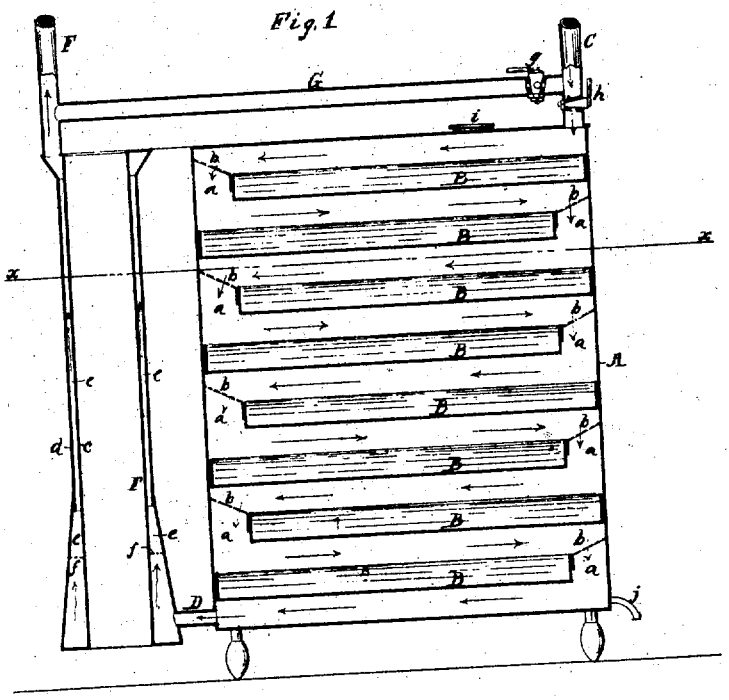
Figure 2:
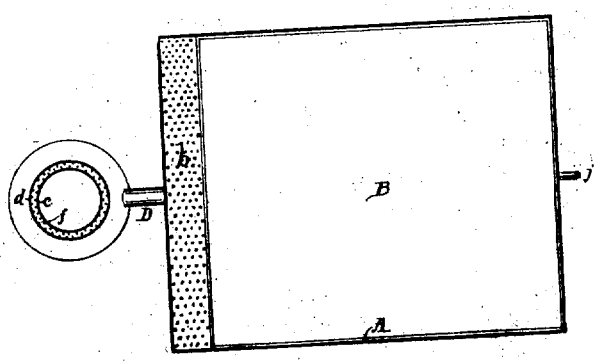

Figure 1 represents a longitudinal vertical section of this invention. Fig. 2 is a horizontal section of the same, the line *x x*, Fig. 1, indicating the plane of section.

Similar letters of reference in both views indicate corresponding parts.

To enable those skilled in the art to make and use my invention, I will proceed to describe its construction and operation.

A represents a vessel or box, of sheet metal, wood, or any other suitable material, and of considerable height, so as to give room for a number of shallow pans, B, which are secured in the interior of the box at certain distances one above the other. These pans are fitted into the box in such a manner that between the ends of the pans and the side walls of the box spaces *a* are left alternately on one and on the other side of said box and pans, as clearly shown in the drawings. These spaces are covered over by strips *b*, of wire-gauze or of perforated sheet metal, which extend from the ends of the pans in a slightly-inclined position up to the side walls of the box.

The upper part of the box A communicates by means of a pipe, C, with the gasometer, and a pipe, D, extends from the bottom of said box into the condenser E, which consists of two concentric tubes, *c d*, one inside the other, as clearly shown in Fig. 1. The inner tube, *c*, is of cylindrical form from one end to the other, and the upper part of the tube *d* forms also a cylinder, which surrounds the inner tube, leaving a passage, *e*, for the gas. The bottom part of the tube *d* is conical, so that the passage *e* increases in width as it approaches the communicating pipe D, and a disk, *f*, of wire-gauze or of perforated sheet metal, is slipped over the tube *c* in such a manner that the passage *e* is completely stopped up a short distance above the communicating tube D, and that all the gas has to pass through the perforations in said disk. The conical part of the tube *d* is cut open, so as to give access to the interior of said tube for the purpose of cleaning the same.

The upper end of the condenser E is furnished with a pipe, F, which conducts the gas to the burners. The pipes C and F are connected by a pipe, G, which is closed by a stop-cock, *g*, and another stop-cock, *h*, is secured to the pipe C, close over its point of connection with the box A. When the latter cock is closed and the cock *g* is opened the gas as it comes from the gasometer passes directly to the burners without making its circuit through the apparatus; but if the cock *g* is closed and the cock *h* is opened, the gas has to pass through the box A and through the condenser E before it reaches the burners.

Any hydrocarbon liquid is introduced through an opening, *i*, on the top of the box A, and a sufficient quantity of liquid is poured in to make the several pans overflow. The surplus liquid is removed from the bottom of the box by a faucet, *j*. When the gas enters the top of the box it strikes directly on the surface of the liquid in the upper pan, and it is forced through the strip of wire-gauze or of perforated sheet metal at the end of this pan, whereby it is slightly arrested and caused to be evenly spread out on the sheet *b*, passing through the same and striking upon the surface of the liquid in the pan below in the form of an even stratum or current of the same width as the perforated plate *b*, and so on through each plate and over each pan until the gas arrives at the bottom of the box, from which it passes through the condenser to the burners. The perforated plates thus serve to check and spread the gas as it advances, preventing one portion from moving faster than the other and causing the gas to be delivered in a steady manner. The use of perforated tubes and devices to steady and spread the flow of gas is well known, and is not claimed broadly as my invention. The combination of the gas-supply pipe C with the top of the apparatus, so that the gas shall enter at the upper part and be forced downward, as shown, causes the gas to pass along over the entire surface of the pans. The pressure or suction being downward, the gas flows close along the surface of the pans, whereas if the flow were upward in this apparatus it is obvious that the gas would pass close up against the bottom of the pans, while at the end of each pan, immediately below the perforated plates, there would be a chamber, into which the gas would ascend and almost wholly escape contact with the liquid in that portion of the pan beneath said chamber; but by causing the gas to flow downward, as set forth, the vapor pours from the surface of one pan directly down upon the next below, and so on through the sieves. By passing the gas as it emanates from the box A through the condenser E, before it reaches the discharge-pipe, any sudden decrease in the temperature causes the less volatile parts of the gas to condense and to form a deposit on the bottom of the condenser, from whence it can easily be removed; whereas if the gas passes from the box A directly to the discharge-pipe a sudden decrease of the temperature causes a deposit in said pipe, whereby the free passage of the gas is obstructed, and from whence said deposit cannot be removed without considerable trouble.

It is manifest that the above-described apparatus can be used for carbureting air as well as gas.

Having thus fully described my invention, what I claim as new, and desire to secure by Letters Patent, is—

1. The combination of the box A, one or more pans B, for containing hydrocarbon liquid, the supply-pipe C, at or near the top, the exit-pipe D, at or near the bottom, and the condenser E, the whole operating substantially as and for the purposes herein set forth.

2. A condenser employed in connection with an air-carbureting apparatus, substantially as and for the purposes set forth.

3. The combination, with the pans or trays B, of the perforated plates *b*, through which the air passes in its course through the carbureting-chamber.

To the above specification of my improvement I have signed my hand this 19th day of March, 1867.

F. S. PEASE.

Witnesses:

CHAS. D. SMITH,
O. EVANS WOODS.